United States Patent
Corghi

(10) Patent No.: US 11,548,330 B2
(45) Date of Patent: Jan. 10, 2023

(54) SYSTEM AND METHOD FOR THE MANAGEMENT OF DATA PERTAINING TO A WHEEL SERVICE

(71) Applicant: NEXION S.P.A., Correggio (IT)

(72) Inventor: Giulio Corghi, Correggio (IT)

(73) Assignee: NEXION S.P.A., Correggio (IT)

( * ) Notice: Subject to any disclaimer, the term of this patent is extended or adjusted under 35 U.S.C. 154(b) by 7 days.

(21) Appl. No.: 17/057,255

(22) PCT Filed: May 9, 2019

(86) PCT No.: PCT/IB2019/053818
§ 371 (c)(1),
(2) Date: Nov. 20, 2020

(87) PCT Pub. No.: WO2019/224641
PCT Pub. Date: Nov. 28, 2019

(65) Prior Publication Data
US 2021/0197630 A1 Jul. 1, 2021

(30) Foreign Application Priority Data
May 22, 2018 (IT) .................. 102018000005600

(51) Int. Cl.
*B60C 23/04* (2006.01)
*G07C 5/00* (2006.01)
*G07C 5/08* (2006.01)

(52) U.S. Cl.
CPC ...... *B60C 23/0442* (2013.01); *B60C 23/0479* (2013.01); *G07C 5/008* (2013.01); *G07C 5/0808* (2013.01); *G07C 2205/02* (2013.01)

(58) Field of Classification Search
CPC ............ B60C 23/0442; B60C 23/0479; B60C 23/0408; B60C 11/246; G07C 5/008; G07C 5/0808; G07C 2205/02
USPC .......................................................... 340/447
See application file for complete search history.

(56) References Cited

U.S. PATENT DOCUMENTS

| | | | |
|---|---|---|---|
| 6,263,322 | B1 | 7/2001 | Kirkevold et al. |
| 7,104,438 | B2 | 9/2006 | Benedict |
| 7,729,823 | B2 | 6/2010 | Ruppolo |
| 9,079,461 | B2 | 7/2015 | Suh |
| 10,611,197 | B2 | 4/2020 | Yu et al. |
| 10,639,945 | B2 | 5/2020 | Ledoux et al. |

(Continued)

FOREIGN PATENT DOCUMENTS

| | | |
|---|---|---|
| CN | 1478242 A | 2/2004 |
| CN | 102096761 A | 6/2011 |

(Continued)

*Primary Examiner* — Omar Casillashernandez
(74) *Attorney, Agent, or Firm* — Pearne & Gordon LLP

(57) ABSTRACT

A system (1) for the management of data pertaining to a wheel service comprises: a database (2) including, for each tyre of a plurality of tyres, a tyre identification code; at least one tyre measurement parameter representing a physical quantity linked to the tyre or to the use thereof, and a related time mark, which indicates the time the tyre measurement parameter was captured; a knowledge dataset (3) containing reference data; a processor (4) having access to the database (2) and to the knowledge dataset (3) and programmed to process the at least one tyre measurement parameter and the reference data and to generate derived data.

20 Claims, 1 Drawing Sheet

(56) References Cited

U.S. PATENT DOCUMENTS

| | | | |
|---|---|---|---|
| 11,216,824 B1* | 1/2022 | Faga | G06Q 30/016 |
| 2004/0073339 A1 | 4/2004 | Ruppolo | |
| 2005/0087593 A1* | 4/2005 | Benedict | B60C 23/0493 |
| | | | 235/375 |
| 2011/0131025 A1 | 6/2011 | Corghi | |
| 2011/0246029 A1 | 10/2011 | Villemin et al. | |
| 2012/0191495 A1 | 7/2012 | Mcintosh et al. | |
| 2014/0277910 A1 | 9/2014 | Suh | |
| 2016/0096402 A1 | 4/2016 | Carlin et al. | |
| 2016/0161373 A1 | 6/2016 | Singh et al. | |
| 2016/0167446 A1 | 6/2016 | Xu et al. | |
| 2016/0299942 A1 | 10/2016 | Li et al. | |
| 2017/0113494 A1 | 4/2017 | Singh et al. | |
| 2017/0190226 A1 | 7/2017 | Parker | |
| 2018/0033284 A1 | 2/2018 | Greenwald et al. | |
| 2018/0093537 A1 | 4/2018 | Yu et al. | |
| 2018/0211231 A1* | 7/2018 | Penilla | G06Q 10/20 |
| 2018/0215211 A1 | 8/2018 | Ledoux et al. | |
| 2019/0084355 A1* | 3/2019 | McPillan | B60C 11/246 |
| 2019/0137262 A1* | 5/2019 | Pryce | B60C 99/006 |
| 2019/0160894 A1* | 5/2019 | Yu | B60C 23/0471 |

FOREIGN PATENT DOCUMENTS

| | | |
|---|---|---|
| CN | 104044413 A | 9/2014 |
| CN | 106156918 A | 11/2016 |
| CN | 107284155 A | 10/2017 |
| CN | 107351607 A | 11/2017 |
| EP | 2327973 A1 | 6/2011 |
| EP | 1526467 A1 | 4/2015 |
| EP | 2777957 | 4/2017 |
| EP | 3028880 | 1/2018 |
| EP | 3300930 A1 | 4/2018 |
| IT | 1390747 | 12/2012 |
| IT | 201800003254 | 9/2019 |
| WO | 2005113261 A1 | 12/2005 |
| WO | 2016070069 A1 | 5/2016 |
| WO | 2017017249 | 2/2017 |
| WO | 2018023013 A1 | 2/2018 |

* cited by examiner

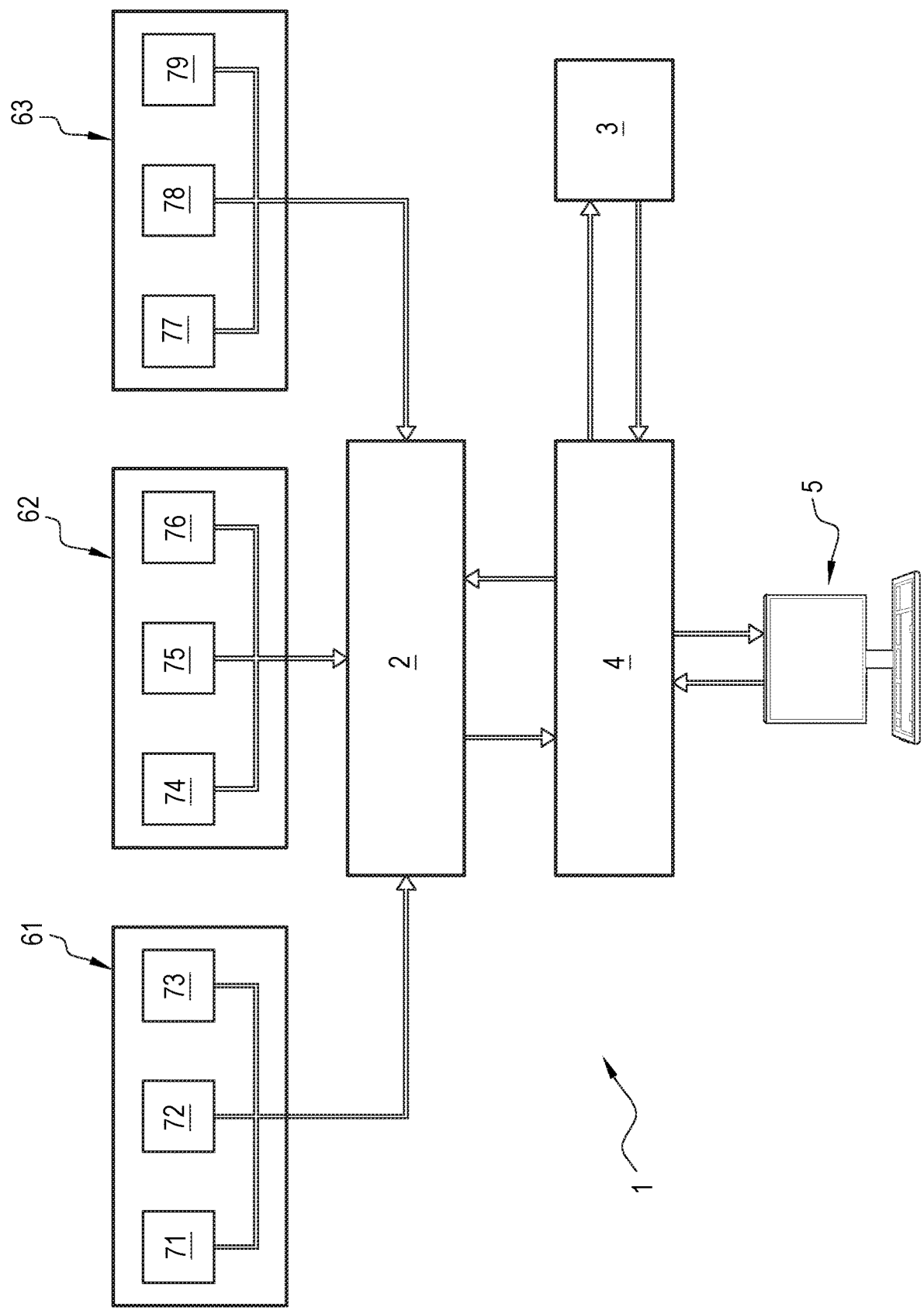

SYSTEM AND METHOD FOR THE MANAGEMENT OF DATA PERTAINING TO A WHEEL SERVICE

TECHNICAL FIELD

This invention relates to a system and a method for the management of data pertaining to a wheel service.

Wheel services are services performed on vehicle wheels and include, for example, mounting and demounting tyres, checking tyre tread, tyre inflation, wheel balancing, wheel alignment, suspension testing, brake testing, drift testing.

BACKGROUND ART

U.S. Pat. No. 6,263,322B1 discloses a system for the management of wheel service orders and information and comprising: an interface configured to receive an instruction from a user, a processor programmed to receive an instruction from the interface and to generate an order (for example, a repair service procedure to be executed) as a function of the instruction, one or more repair devices configured to receive the order and in turn to transmit up-to-date information to the processor regarding execution of the procedure; the history of the instructions and orders is stored in a database. This system allows the repair service procedures to be carried out in a coordinated and organized manner.

Patent document WO2018023013A1 provides a system comprising a sensor for detecting a signal pertaining to the use of an electrical appliance (for example, absorbed current), a processor connected to the sensor to sample the signals measured, a database configured to store the signals measured by the sensor and sampled by the processor, a transmitter configured to transmit the signals to a communications network, to determine an operating condition of the electrical appliance. The heart of this system is the electrical appliance; the system allows organizing and cross-referencing the signals measured by the tools to promptly identify any possible faults.

Patent document WO2017017249A1 provides a system for assessing the condition of a tyre, comprising: at least a first and a second module, each including a housing containing at least one detection device for measuring a parameter; a remote database connected to the first and the second module, means of cooperation between the first and the second module, responsible for combining the information from the two modules with the information contained in the database in order to assess the condition of the tyre. The system is therefore designed to assess the general condition of a tyre by combining the information from different detection devices.

Patent document WO2016070069A1 describes a system for providing information regarding tyre accessories, wheel balancing weights, tyre pressure monitoring systems or service kits suitable for a motor car; the system is configured to capture an image of a vehicle identification code (for example by reading a barcode or a QR code), to process the image captured and to query a database (which associates each vehicle identification code with an information set—including, for example, a tyre accessory or a wheel balancing weight) in order to obtain that information and transmit it to a communications network.

Patent document EP3300930A1 discloses a method comprising the steps of entering in a tyre pressure diagnostic tool information regarding a vehicle owner; entering a vehicle identification number; entering a tyre identification number; measuring a tyre environment parameter by means of a pressure sensor.

Systems for interconnecting wheel service equipment are therefore known. The known systems, however, are limited to merely bringing together information from different measuring systems or tools, and, if necessary, communicating with a database in which the information is stored. In the prior art, the database may be used as a library from which information can be drawn (as in the case of document WO2016070069A1) or as a historical memory (as in document U.S. Pat. No. 6,263,322B1) but is in any case limited to being an ordered collection of information.

In the wheel service sector, but not only in that sector, there is therefore a need for a database capable not only of collecting information from different wheel service tools in as complete a manner as possible but also to use that information for subsequent processes according to criteria intended to provide an end user with derived quantities or signals calculated from that information (for example, alarms, forecasts, suggestions regarding actions to be taken).

DISCLOSURE OF THE INVENTION

The aim of this disclosure is to provide a system and a method for the management of data pertaining to a wheel service to overcome the above mentioned disadvantages of the prior art.

More generally speaking, the aim of this disclosure is to provide a system and a method for the management of data pertaining to a vehicle (or a plurality of vehicles) to overcome the above mentioned disadvantages of the prior art.

This aim is achieved by the system and method for the management of data pertaining to a wheel service forming the object of this disclosure and as characterized in the appended claims.

In one embodiment, the system of this disclosure is a system for the management of data pertaining to a wheel service. In one embodiment, the system of this disclosure is a system for the management of data pertaining to a vehicle (or a plurality of vehicles).

In one embodiment, the system of this disclosure is of the type described in Italian patent 0001397047 to the present Applicant and incorporated herein by reference. It is expressly understood that all the functional and structural features of the apparatus of Italian patent 0001397047 can be applied to this embodiment of the system.

The system comprises a database. In one embodiment, the database is an electronic database. In one embodiment, the database is a remote (cloud) database. In one embodiment, the database is a local database (for example, a storage disk).

For each tyre of a plurality of tyres, the database includes a tyre identification code. The identification code is uniquely linked to the respective tyre. In one embodiment, the identification code is a sequence code assigned arbitrarily to the tyre. In one embodiment, the identification code is a code assigned by a tyre manufacturer (specific to the particular tyre).

For each tyre of the plurality of tyres, the database includes at least one tyre measurement parameter. In one embodiment, the tyre measurement parameter represents a physical quantity linked to the tyre. In one embodiment, the tyre measurement parameter represents a physical quantity linked to tyre use (for example, if the tyre has been used on the left- or right-hand side of the vehicle). In one embodiment, the tyre measurement parameter represents at least one physical quantity linked to the tyre. In one embodiment, the tyre measurement parameter represents a plurality of physical quantities connected with the tyre. In one embodiment, the tyre measurement parameter is an aggregate parameter representing a plurality of physical quantities connected with tyre use. For each tyre of the plurality of tyres, the database includes a plurality of tyre measurement parameters.

For each tyre measurement parameter, the database includes a time mark. The time mark provides an indication of the time the tyre measurement parameter was captured. In one embodiment, the time mark includes the date the tyre measurement parameter was captured. In one embodiment, the time mark includes the time the tyre measurement parameter was captured.

The at least one tyre measurement parameter includes one or more of the following parameters: tyre runout; minimum and/or maximum depth of tyre tread; tyre tread profile; tyre pressure; tyre noise; tyre radial forces; tyre lateral forces; distance travelled by the tyre; rolling resistance of tyre; coefficient of elasticity of tyre; maximum strain applied to bead during demounting; tyre age; vertical load of tyre; maximum temperature of tyre in use; lateral force while rolling; weight force while rolling; distance travelled by vehicle with tyre mounted; distance travelled by vehicle with tyre mounted on right-hand side of vehicle; distance travelled by vehicle with tyre mounted on left-hand side of vehicle; front axle; rear axle.

In one embodiment, the database includes, for each tyre of the plurality of tyres a history of operations and checks carried out on the tyre.

In one embodiment, the database includes, for each tyre of the plurality of tyres, at least one characteristic tyre parameter, where the at least one characteristic tyre parameter includes one or more of the following parameters: tyre make and model; summer, winter or all seasons tyre type; tyre manufacturing date.

The system includes a knowledge dataset (or a knowledge database). The knowledge dataset contains (a plurality of) reference data. In one embodiment, the reference data represent a model of vehicle road behaviour. In one embodiment, the reference data represent a state (or condition) of the tyre. In one embodiment, the reference data represent a state (or condition) of the vehicle. The reference data may include threshold values relating to the at least one tyre measurement parameter. In one embodiment, the threshold values relating to the at least one tyre measurement parameter are defined by standards and regulations. In one embodiment, the threshold values relating to the at least one tyre measurement parameter are provided by the tyre manufacturer. The reference data may include one or more processing criteria. In one embodiment, the processing criteria comprise criteria for aggregating the at least one tyre measurement parameter. In one embodiment, the processing criteria provide a criterion of comparison between the tyre measurement parameter and the respective threshold values (for example, the measurement parameter must be less than a certain threshold value, with a certain tolerance). The processing criteria may include mathematical formulas. The reference data may include constants for the mathematical formulas. For example, the processing criteria may include mathematical formulas in which constants and variables appear, where the values of the constants are also contained in the knowledge dataset (or possibly in the database) and the values of the variables are determined by the tyre measurement parameter.

In one embodiment, the database includes the knowledge dataset (for example, a part of the database might constitute the knowledge dataset and thus might contain the reference data). In one embodiment, the database and the knowledge dataset are separate data collections.

The system includes a processor. The processor has access to the database. The processor is programmed to process the at least one tyre measurement parameter. The processor is programmed to process (jointly) the at least one tyre (or vehicle) measurement parameter and the reference data. The processor is programmed to generate derived data.

The derived data include one or more of the following parameters: tyre wear index at the time the at least one tyre measurement parameter was captured; irregular tyre wear index at the time the at least one tyre measurement parameter was captured; trend of tyre wear index during use of the tyre; trend of irregular tyre wear index during use of the tyre; trend of tyre pressure during use of the tyre; scheduled tyre change date. In possible embodiments, the derived data include alarm (alert) signals.

In one embodiment, the derived data represent a tyre wear trend. In one embodiment, the derived data represent the behaviour of a motorist. In one embodiment, the derived data include a suggestion for a motorist as to the types of tyre most suitable for their vehicle. In one embodiment, the derived data include forecasts as to a future fault/necessary maintenance on the tyre (or on the vehicle).

Hence, preferably, the reference data are invariant over time and remain constant during a life of the tyre; in fact, in at least one embodiment, they represent one or more reference values for said measurement parameter. On the contrary, the measurement parameter may take a first value at a first time step during the life of the tyre and a second value at a second time step (subsequent to the first time step) during the life of the tyre. The elaborator is programmed, in at least one embodiment, for comparing the measurement parameter (o a plurality of measurement parameters) with corresponding reference data and to generate derived data as a function of a deviation of the measurement parameter from said one or more reference values included in the reference data.

In one embodiment, the processor is configured to store the derived data.

In one embodiment, the processor is configured to store the derived data in the database.

In one embodiment, the processor is programmed to update the reference data (contained in the knowledge dataset) as a function of the derived data. In one embodiment, the processor includes an artificial intelligence system configured to update the reference data as a function of the derived data. In one embodiment, the processor is programmed to update the reference data (contained in the knowledge dataset) as a function of the derived data and instructions given by a user.

In one embodiment, the database also includes a vehicle identification code for each vehicle. The vehicle identification code is uniquely linked to the vehicle. In one embodiment, the vehicle identification code includes an arbitrary sequence code. In one embodiment, the vehicle identification code includes the vehicle registration number. In one embodiment, the vehicle identification code includes the VIN. In one embodiment, the vehicle identification code includes the chassis number.

In one embodiment, the database includes at least one vehicle measurement parameter for each vehicle. In one embodiment, the vehicle measurement parameter represents a physical quantity linked to the vehicle. In one embodiment, the vehicle measurement parameter represents a physical quantity linked to use of the vehicle.

The vehicle measurement parameter includes one or more of the following parameters: vehicle wheel alignment data; vehicle braking data (from brake test); data relating to vehicle suspensions (for example, damping or efficiency of suspensions); vehicle drift data; real consumption of vehicle; distance travelled by vehicle; vehicle weight measurement data; emissions data from exhaust gas test; emissions data from opacity level test (for Diesel vehicles); vehicle noise data; data relating to vehicle lights (from lights test).

In one embodiment, the database includes, for each vehicle, a history of operations and checks carried out on the vehicle. These operations and tests carried out on the vehicle may include ordinary and/or extraordinary maintenance operations and/or tests carried out by specialist repair shops, for example, periodic inspections like MOT (Ministry of Transport) inspections.

In one embodiment, the database includes, for each vehicle, at least one characteristic vehicle parameter, where the at least one characteristic vehicle parameter includes one or more of the following parameters: vehicle make and model; identification code of an electronic control unit of the vehicle; date of vehicle manufacture.

In one embodiment, the database includes, for each vehicle measurement parameter, a respective time mark. The time mark provides an indication of the time the vehicle measurement parameter was captured (for example, the date).

In one embodiment, the reference data contained in the knowledge dataset include one or more threshold values relating to the at least one vehicle measurement parameter. In one embodiment, the threshold values relating to the at least one vehicle measurement parameter are defined by standards and regulations. In one embodiment, the threshold values relating to the at least one vehicle measurement parameter are defined by a manufacturer of the vehicle. In one embodiment, the reference data contained in the knowledge dataset include one or more processing criteria relating to the vehicle (for example, criteria of comparison between the vehicle measurement parameters and the respective threshold values, and/or mathematical formulas including vehicle measurement parameters as variables). In one embodiment, the processor is configured to use the one or more processing criteria relating to the vehicle to compare the at least one vehicle measurement parameter with the respective threshold values to generate (part of) the derived data.

In one embodiment, the database is accessible to one or more repair shops. Each repair shop comprises (a plurality of) tools. In one embodiment, the tools are used to capture at least one tyre measurement parameter. In one embodiment, the tools are used to capture at least one vehicle measurement parameter.

In one embodiment, the tools form part of the system. In another embodiment, the tools are connected to the system.

In one embodiment, the database includes a tool identification code for one or more of the tools. The tool identification code is uniquely correlated with the tool. The tool identification code may be an arbitrary sequence code. In one embodiment, the database includes at least one measurement parameter for one or more of the tools. In one embodiment, the tool measurement parameter represents a physical quantity linked to the tool. In one embodiment, the tool measurement parameter represents a physical quantity linked to use of the tool.

The at least one tool measurement parameter includes one or more of the following parameters: tool energy consumption; tool compressed air consumption; number of tool use cycles.

In one embodiment, the database includes, for each tool, a history of maintenance operations carried out on the tool.

In one embodiment, the database includes, for each tool measurement parameter, a respective time mark. The time mark provides an indication of the time the tool measurement parameter was captured (for example, the date or time).

In one embodiment, the reference data contained in the knowledge dataset include one or more threshold values relating to the at least one tool measurement parameter. In one embodiment, the reference data contained in the knowledge dataset include one or more processing criteria relating to the tool (for example, criteria of comparison between the tool measurement parameters and the respective threshold values, and/or mathematical formulas including tool measurement parameters as variables).

In one embodiment, the database includes a correlation which associates each tyre identification code with the identification code of the respective vehicle. In one embodiment, the database includes a link table which links to each other the tyre identification code, the vehicle identification code and the vehicle owner.

In one embodiment, the database includes a correlation which associates each tyre measurement parameter with the identification code of the tool that was used to capture that tyre measurement parameter.

In one embodiment, the database includes a correlation which associates each vehicle measurement parameter with the identification code of the tool that was used to capture that vehicle measurement parameter.

In one embodiment, the system includes a user interface. The user interface is connected to the processor. In one embodiment, the user interface is configured to provide one or more addressees with the at least one tyre measurement parameter. In one embodiment, the user interface is configured to provide one or more addressees with the at least one vehicle measurement parameter. In one embodiment, the user interface is configured to provide one or more addressees with the at least one tool measurement parameter. In one embodiment, the user interface is configured to provide one or more addressees with the derived data. The user interface may, for example, include a screen. The user interface may also include a printer. The user interface may also include a printer for printing a QR code or a bar code used to store the derived data and/or the at least one tyre measurement parameter and/or the vehicle measurement parameter and/or the tool measurement parameter.

In one embodiment, the user interface is configured to allow a user to impart one or more instructions to the processor. The user's instruction may, for example, include indications as to what reference data contained in the knowledge dataset must be used to generate the derived data. The user's instruction may include indications as to what derived data must be generated.

This disclosure also relates to a method for the management of data pertaining to a wheel service. More generally speaking, this disclosure relates to a method for the management of data pertaining to a service for a vehicle (or a plurality of vehicles).

The method comprises a step of collecting in a database a tyre identification code for each tyre of a plurality of tyres. The step of collecting further comprises collecting in the database at least one tyre measurement parameter for each tyre of a plurality of tyres. The tyre measurement parameter represents a physical quantity linked to the tyre or to a use thereof. The step of collecting further comprises collecting in the database, for each tyre measurement parameter, a respective time mark which provides an indication of the time the tyre measurement parameter was captured.

The method comprises a step of processing the at least one measurement parameter contained in the database and generating derived data by means of a processor.

In one embodiment of it, the method comprises a step of storing the derived data. Preferably, the derived data are stored in the database.

In one embodiment, the derived data are obtained, during the step of processing, as a function of the at least one tyre measurement parameter and reference data. The reference data are drawn from a knowledge dataset connected to the processor. The reference data represent a model of vehicle road behaviour.

In one embodiment, the reference data include one or more threshold values relating to the at least one tyre measurement parameter. In one embodiment, the reference data include one or more processing criteria relating to the tyre.

In one embodiment, the step of processing includes comparing the at least one tyre measurement parameter with the respective threshold values, based on the one or more processing criteria relating to the tyre. The comparison allows generating the derived data (or parts thereof).

In one embodiment, the method comprises a step of updating the reference data (contained in the knowledge dataset) as a function of the derived data. In one embodiment, the step of updating is performed by the processor, based on instructions imparted by a user (for example, through an interface). In one embodiment, the step of updating is performed by the processor by means of an artificial intelligence system.

In one embodiment, the database includes a vehicle identification code for each vehicle. In one embodiment, the database also includes, for each vehicle, at least one vehicle measurement parameter representing a physical quantity linked to the vehicle or to a use thereof. In one embodiment, the database also includes, for each vehicle measurement parameter, a respective time mark which provides an indication of the time the vehicle measurement parameter was captured.

In one embodiment, the reference data contained in the knowledge dataset include one or more threshold values relating to the at least one vehicle measurement parameter. In one embodiment, the reference data contained in the knowledge dataset include one or more processing criteria relating to the vehicle.

In one embodiment of it, the method comprises a step of associating a tyre with the respective vehicle. The step of associating is performed by the processor by means of a correlation, contained in the database, which associates each tyre identification code with the identification code of the respective vehicle.

In one embodiment, the database is accessible to one or more repair shops and each repair shop comprises one or more tools. In one embodiment, the method comprises a step of capturing the at least one vehicle measurement parameter by means of the tools. In one embodiment, the method comprises a step of capturing the at least one tyre measurement parameter by means of the tools.

In one embodiment, the database also includes a tool identification code for one or more of the tools.

In one embodiment, the method comprises a step of associating a vehicle measurement parameter with the tool that was used to capture that vehicle measurement parameter. The step of associating is performed by the processor by means of a correlation, contained in the database, which associates each vehicle measurement parameter with the identification code of the tool that was used to capture that vehicle measurement parameter.

In one embodiment, the method comprises a step of associating a tyre measurement parameter with the tool that was used to capture that tyre measurement parameter. The step of associating is performed by means of a correlation, contained in the database, which associates each tyre measurement parameter with the identification code of the tool that was used to capture that tyre measurement parameter.

In one embodiment, the step of processing includes deriving the derived data also as a function of the at least one vehicle measurement parameter and reference data contained in the knowledge base.

In one embodiment, the database includes a tool identification code for one or more of the tools. In one embodiment, the database includes at least one measurement parameter for one or more of the tools. The at least one tool measurement parameter represents a physical quantity linked to the tool or to a use thereof.

In one embodiment, the step of processing comprises deriving the derived data also as a function of the at least one tool measurement parameter and reference data contained in the knowledge base.

In one embodiment, the reference data contained in the knowledge dataset include one or more threshold values relating to the at least one tool measurement parameter and one or more processing criteria relating to the tool. In one embodiment, the step of processing comprises comparing the at least one tool measurement parameter with the respective threshold values, based on the one or more processing criteria relating to the tool, in order to generate derived data (or a part thereof).

In one embodiment, the method comprises a step of communicating the tyre measurement parameter to one or more addressees by means of a user interface. In one embodiment, the method comprises a step of communicating the derived data to one or more addressees by means of the user interface.

In one embodiment, the method comprises a step of associating the vehicle identification code with an electronic control unit of the vehicle. In one embodiment, the method comprises a step of receiving at least one vehicle measurement parameter from the electronic control unit. In one embodiment, the method comprises a step of receiving at least one tyre measurement parameter from the electronic control unit. In one embodiment, the method comprises a step of sending at least one signal (for example, an alarm or alert signal) to the electronic control unit, as a function of at least one derived data item, in order to inform a user that the vehicle must be taken to the repair shop.

BRIEF DESCRIPTION OF DRAWINGS

These and other features are more apparent from the following description of a preferred embodiment, illustrated by way of non-limiting example in the accompanying drawing, in which:

FIG. 1 illustrates a system for the management of data pertaining to a service for a wheel (or a vehicle or a plurality of vehicles) according to this disclosure.

DETAILED DESCRIPTION OF PREFERRED EMBODIMENTS OF THE INVENTION

With reference to the accompanying drawing, the numeral 1 denotes a system for the management of data pertaining to a service for a wheel (or a vehicle or a plurality of vehicles) according to this disclosure.

The system 1 comprises a database 2. The database 2 may be a local database. The database 2 may be a remote (cloud) database.

In one embodiment, for each tyre of a plurality of tyres, the database 2 includes a tyre identification code. The tyre identification code may be a sequence code assigned arbitrarily. In one embodiment, the tyre identification code is a barcode applied on the tyre (with adhesive for example). In one embodiment, the tyre identification code is a QR code applied on the tyre (with adhesive for example). In one embodiment, the tyre identification code is an RFID tag applied on the tyre. In one embodiment, the tyre identification code is text printed on the sidewall of the tyre. In one embodiment, the tyre identification code is a code transmitted by a wireless transmitter built into the tyre (in the tyre compound, for example).

For each tyre, the database 2 may include one or more characteristic tyre parameters. The characteristic tyre parameters are uniquely correlated with the tyre identification code. The characteristic tyre parameters are constant during the working life of the tyre. The one or more characteristic tyre parameters may include one or more of the following parameters: make, model, actual tyre size (according to ISO code), summer/winter/all seasons tyre type.

For each tyre, the database 2 includes at least one tyre measurement parameter. For each tyre measurement parameter, the database 2 includes a respective time mark which provides an indication of the time the tyre measurement parameter was captured.

The vehicle identification code may be a sequence code assigned arbitrarily. In one embodiment, the vehicle identification code is a barcode applied on the vehicle (with adhesive for example) or stamped on a tag visible from the vehicle windscreen. In one embodiment, the vehicle identification code is a QR code applied on the vehicle (with adhesive for example).

For each vehicle, the database 2 may include at least one characteristic vehicle parameter.

The at least one characteristic vehicle parameter may include one or more of the following parameters: registration number, make, model, engine, version, electronic control unit identification code, protocol of communication with electronic control unit.

In one embodiment, the database 2 includes at least one vehicle measurement parameter for each vehicle. For each vehicle measurement parameter, the database 2 includes a respective time mark which provides an indication of the time the vehicle measurement parameter was captured.

In one embodiment, the system 1 comprises a plurality di repair shops 61, 62, 63. In one embodiment, the plurality di repair shops comprises a first repair shop 61. In one embodiment, the first repair shop 61 comprises a first tool 71, a second tool 72 and a third tool 73. In one embodiment, the plurality di repair shops comprises a second repair shop 62. In one embodiment, the second repair shop 62 comprises a fourth tool 74, a fifth tool 75 and a sixth tool 76. In one embodiment, the plurality di repair shops comprises a third repair shop 63. In one embodiment, the third repair shop 63 comprises a seventh tool 77, an eighth tool 78 and a ninth tool 79.

The tools 71, 72, 73, 74, 75, 76, 77, 78, 79 may include a wheel service machine. The tools 71, 72, 73, 74, 75, 76, 77, 78, 79 may include a tyre changing machine. The tools 71, 72, 73, 74, 75, 76, 77, 78, 79 may include a wheel balancing machine. The tools 71, 72, 73, 74, 75, 76, 77, 78, 79 may include a tyre inflating machine. The tools 71, 72, 73, 74, 75, 76, 77, 78, 79 may include an alignment measuring tool. The tools 71, 72, 73, 74, 75, 76, 77, 78, 79 may include a brake test bench. The tools 71, 72, 73, 74, 75, 76, 77, 78, 79 may include a suspension test bench. The tools 71, 72, 73, 74, 75, 76, 77, 78, 79 may include a drift test bench.

The tools 71, 72, 73, 74, 75, 76, 77, 78, 79 may include a tread checking system. In one embodiment, the tread checking system is of the type described in Italian patent application 102018000003254 in the name of the present Applicant and incorporated herein by reference. It is expressly understood that all the functional and structural features of the apparatus of Italian patent application 102018000003254 can be applied to this embodiment of the system.

In one embodiment, the tools 71, 72, 73, 74, 75, 76, 77, 78, 79 are used to capture at least one tyre measurement parameter.

In one embodiment, the at least one tyre measurement parameter includes tyre runout. Tyre runout can be obtained from a balancing machine. Tyre runout can be obtained from a tyre changing machine.

In one embodiment, the at least one tyre measurement parameter includes tyre tread depth. Tyre tread depth can be obtained from a balancing machine. Tyre tread depth can be obtained from a tyre changing machine. Tyre tread depth can be obtained from a tread checking system.

In one embodiment, the at least one tyre measurement parameter includes tyre pressure at the beginning of wheel service. Tyre pressure at the beginning of wheel service can be measured with a pressure gauge forming part of an inflation device. Tyre pressure at the beginning of wheel service can be measured with a pressure gauge forming part of a wheel service tool. Tyre pressure at the beginning of wheel service can be measured with a tyre pressure monitoring system on the wheels.

In one embodiment, the at least one tyre measurement parameter includes tyre pressure at the end of wheel service. Tyre pressure at the end of wheel service can be measured with a pressure gauge forming part of an inflation device. Tyre pressure at the end of wheel service can be measured with a pressure gauge forming part of a wheel service tool. Tyre pressure at the end of wheel service can be measured with a tyre pressure monitoring system on the wheels.

In one embodiment, the at least one tyre measurement parameter includes tyre pressure during use of the vehicle. Tyre pressure during use of the vehicle can be measured with a tyre pressure monitoring system on the wheels and can be stored on vehicle-mounted electronic devices or transmitted to a cloud storage service or to the motorist's smartphone.

In one embodiment, the at least one tyre measurement parameter includes tyre temperature during tyre use. Tyre temperature during tyre use can be measured with a tyre temperature monitoring system on the wheels and can be stored on vehicle-mounted electronic devices or transmitted to a cloud storage service or to the motorist's smartphone.

In one embodiment, the at least one tyre measurement parameter includes tyre noise during tyre use. Tyre noise during tyre use can be measured with a sound level meter or a microphone forming part of a wheel service tool with roller.

In one embodiment, the at least one tyre measurement parameter includes a coefficient of friction between a wheel and a reference surface (sliding friction). The coefficient of friction between a wheel and a reference surface (sliding friction) can be measured with a wheel service tool with roller.

In one embodiment, the at least one tyre measurement parameter includes rolling resistance (rolling friction). The rolling resistance (rolling friction) can be measured with a wheel service tool with roller.

In one embodiment, the at least one tyre measurement parameter includes a tyre elasticity coefficient. The tyre elasticity coefficient can be measured with a wheel service tool with roller.

In one embodiment, the at least one tyre measurement parameter includes an angular vibration and/or radial vibration resonance parameter. The angular vibration and/or radial vibration resonance parameter can be measured with a wheel service tool with roller. The angular vibration and/or radial vibration resonance parameter can be measured by vibration sensors forming part of tools with wheel shaft.

In one embodiment, the at least one tyre measurement parameter includes maximum strain applied to a bead during mounting. The maximum strain applied to a bead during mounting can be measured by sensors forming part of tyre changing machines.

In one embodiment, the at least one tyre measurement parameter includes a maximum value of a tyre-road grip coefficient. The maximum value of a tyre-road grip coefficient can be measured by a wheel service tool with roller or belt.

In one embodiment, the tools 71, 72, 73, 74, 75, 76, 77, 78, 79 are used to capture at least the at least one vehicle measurement parameter.

The at least one vehicle measurement parameter may comprise vehicle wheel alignment data (toe, camber, caster). The vehicle wheel alignment data can be measured by alignment measuring tools.

The at least one vehicle measurement parameter may comprise vehicle diagnostic data.

The at least one vehicle measurement parameter may comprise data measured in an MOT inspection line.

The at least one vehicle measurement parameter may comprise vehicle brake data. The vehicle brake data can be measured by a brake test bench. In one embodiment, the brake test bench forms part of an MOT inspection line.

The at least one vehicle measurement parameter may comprise vehicle suspension data (for example, damping coefficient, damping constant, resonance frequency, stiffness constant, efficiency). The vehicle suspension data can be measured by a suspension test bench. In one embodiment, the suspension test bench forms part of an MOT inspection line.

The at least one vehicle measurement parameter may comprise vehicle drift data (for example, lateral drift). The vehicle drift data can be measured with a drift test bench or wheel service tools with rollers. In one embodiment, the drift test bench forms part of the MOT inspection line.

The at least one vehicle measurement parameter may include vehicle noise data. The vehicle noise data can be measured by a sound level meter. In one embodiment, the sound level meter forms part of the MOT inspection line.

The at least one vehicle measurement parameter may include vehicle lights data. The vehicle lights data can be measured by a lights test bench. In one embodiment, the lights test bench forms part of the MOT inspection line.

The at least one vehicle measurement parameter may include vehicle weight measurement data. The vehicle weight measurement data can be measured with a scale. In one embodiment, the scale forms part of the MOT inspection line.

The at least one vehicle measurement parameter may include vehicle emissions data. The vehicle emissions data can be measured by analysing the vehicle exhaust gases. In one embodiment, the vehicle exhaust gases can be analysed with a tool forming part of the MOT inspection line.

The at least one vehicle measurement parameter may include data from an opacity level test (for Diesel vehicles). In one embodiment, the opacity level test is performed with a tool forming part of the MOT inspection line.

In one embodiment, an electronic control unit (for example, the electronic control unit of the engine) is connected to a vehicle diagnostic tool.

In one embodiment, the diagnostic tool communicates with the processor 4.

The at least one vehicle measurement parameter may comprise the distance travelled by the vehicle. The distance travelled by the vehicle can be entered manually by a user from a user interface 5. The distance travelled by the vehicle can be communicated by the electronic control unit of the vehicle to the diagnostic tool (and by the latter to the processor 4).

In one embodiment, the processor 4 communicates with the diagnostic tool and stores the distance travelled by the vehicle in the database 2 (with the respective time mark) and/or uses them to obtain the derived data.

In one embodiment, the at least one vehicle measurement parameter comprises vehicle consumption data. In one embodiment, the vehicle consumption data can be communicated by the electronic control unit of the vehicle to the diagnostic tool (and by the latter to the processor 4). In one embodiment, the processor 4 communicates with the diagnostic tool and stores the vehicle consumption data in the database 2 (with the respective time mark) and/or uses them to obtain the derived data.

In one embodiment, the at least one vehicle measurement parameter comprises errors detected on one or more sensors (of the vehicle). In one embodiment, the errors detected on one or more sensors are communicated by the electronic control unit of the vehicle to the diagnostic tool (and by the latter to the processor 4). In one embodiment, the processor 4 communicates with the diagnostic tool and stores the errors detected on one or more sensors in the database 2 (with the respective time mark) and/or uses them to obtain the derived data.

In one embodiment, the at least one vehicle measurement parameter comprises errors detected on one or more actuators (of the vehicle). In one embodiment, the errors detected on one or more actuators are communicated by the electronic control unit of the vehicle to the diagnostic tool (and by the latter to the processor 4). In one embodiment, the processor 4 communicates with the diagnostic tool and stores the errors detected on one or more actuators in the database 2 (with the respective time mark) and/or uses them to obtain the derived data.

In one embodiment, the at least one vehicle measurement parameter comprises data for reprogramming the electronic control unit (of the vehicle). In one embodiment, the data for reprogramming the electronic control unit are communicated by the diagnostic tool (that is, by the processor 4) to the electronic control unit of the vehicle. In one embodiment, the processor 4 communicates with the diagnostic tool and stores the data for reprogramming the electronic control unit in the database 2 (with the respective time mark) and/or uses them to obtain the derived data.

In one embodiment, the at least one vehicle measurement parameter comprises vehicle spare parts codes (for example, remote controls, replacement keys, immobilizer control units, airbag or injector control units). In one embodiment, the spare parts codes are communicated by the diagnostic tool of the vehicle to the electronic control unit (or electronic control units). In one embodiment, the processor 4 communicates with the diagnostic tool and stores the spare parts codes in the database 2 (with the respective time mark) and/or uses them to obtain the derived data.

In one embodiment, the database also includes at least one characteristic tool parameter for one or more of the tools 71, 72, 73, 74, 75, 76, 77, 78, 79. The at least one characteristic tool parameter may include one or more of the following parameters: tool type; tool serial number; repair shop where the tool is located; geographical coordinates of the tool.

In one embodiment, the database also includes, for one or more of the tools 71, 72, 73, 74, 75, 76, 77, 78, 79, at least one tool measurement parameter representing a physical quantity linked to the tool 71, 72, 73, 74, 75, 76, 77, 78, 79 or to a use thereof. In one embodiment, the database also includes, for each tool measurement parameter, a respective time mark which provides an indication of the time the tool measurement parameter was captured.

In one embodiment, the at least one tool measurement parameter includes tool energy consumption. The energy consumption of the tool can be measured by devices built into the tool itself or (in the case of older generation tools which are not provided with such devices) by meters external of the tool.

In one embodiment, the at least one tool measurement parameter includes a number of tool use cycles. The number of tool use cycles can be measured by devices built into the tool itself or (in the case of older generation tools which are not provided with such devices) by devices external of the tool.

In one embodiment, the at least one tool measurement parameter includes the date of the last operation on the tool. The date of the last operation on the tool can be entered manually by a user from a user interface 5.

In one embodiment, for each tyre, the database 2 includes an association with a respective rim. In one embodiment, for each rim, the database 2 includes a rim identification code. The rim identification code may be a sequence number. The rim identification code may be a QR code or a barcode applied on the rim (with adhesive for example). The rim identification code may be an RFID tag applied on the rim.

In one embodiment, for each rim (corresponding to a tyre of the plurality, the database 2 includes one or more characteristic rim parameters. The one or more characteristic rim parameters may include one or more of the following parameters: make, model, profile, number of spokes, type of spoke.

In one embodiment, the database 2 includes at least one vehicle measurement parameter for each rim. In one embodiment, the tools 71, 72, 73, 74, 75, 76, 77, 78, 79 (or some of them) are configured to capture the at least one rim measurement parameter.

In one embodiment, the at least one rim measurement parameter includes rim runout.

In one embodiment, for each tyre and for each rim, the database 2 includes an association with a respective wheel. In one embodiment, for each wheel, the database 2 includes a wheel identification code. The wheel identification code may be a sequence number. The wheel identification code may be a QR code or a barcode applied on the wheel (with adhesive for example). The wheel identification code may be an RFID tag applied on the wheel. Preferably, the wheel identification code is made up of a correlation between the identification code of the respective tyre and the identification code of the respective rim.

In one embodiment, the database 2 includes at least one vehicle measurement parameter for each wheel. In one embodiment, the tools 71, 72, 73, 74, 75, 76, 77, 78, 79 (or some of them) are configured to capture the at least one wheel measurement parameter.

In one embodiment, the at least one wheel measurement parameter includes a wheel rolling radius. The rolling radius of the wheel can be measured with an alignment measuring tool with roller.

In one embodiment, the at least one wheel measurement parameter includes a wheel-road surface contact area. In one embodiment, the wheel-road surface contact area may be measured by a wheel service tool with roller or belt.

In one embodiment, the system 1 comprises a knowledge dataset 3. The knowledge dataset 3 contains reference data.

The reference data may include one or more processing models. The processing models may include mathematical models and formulas. For example, the reference data may include a mathematical model which can be summed up in the following formula (1)

$$f(x,y,A,B)=0 \qquad (1)$$

where, for each wheel, "x" is the toe angle, "y" the camber angle, "A" the lateral force during rolling and "B" the weight force during rolling.

For example, this formula can be used in the mathematical model of a tyre described by "Pacejka's Magic Formula" (Pacejka, Bakker et al. (1987). This model represents complex and semi-empirical relations which take into consideration the interaction between the longitudinal force and the lateral force of the tyre under combined braking and steering conditions.

Generally speaking, the reference data represent a model of vehicle road behaviour.

The knowledge dataset 3 is typically a proprietary database.

The system 1 comprises a processor 4. The processor 4 has access to the database 2. The processor 4 has access to the knowledge dataset 3. The processor 4 is programmed to process the at least one tyre measurement parameter. The processor 4 is programmed to process the at least one vehicle measurement parameter. The processor 4 is programmed to process the at least one tool measurement parameter. The processor 4 is programmed to process the at least one wheel measurement parameter. The processor 4 is programmed to process the at least one rim measurement parameter. The processor 4 is programmed to process the reference data. The processor 4 is programmed to generate derived data.

The derived data may include a tyre wear index. The processor 4 generates the tyre wear index from the at least one tyre measurement parameter.

The derived data may include an irregular tyre wear index. The processor 4 generates the irregular tyre wear index from the at least one tyre measurement parameter.

The derived data may include a trend of tyre wear index during use of the tyre. The processor 4 derives the trend of tyre wear index during use of the tyre as a function of tyre measurement parameters and of the respective time marks.

The derived data may include a trend of irregular tyre wear index during use of the tyre. The processor 4 derives the trend of irregular tyre wear index during use of the tyre as a function of tyre measurement parameters and of the respective time marks.

The derived data may include a trend of tyre pressure during use of the tyre. The processor 4 derives the trend of tyre pressure during use of the tyre as a function of tyre measurement parameters and of the respective time marks.

The derived data may include a scheduled tyre change date. In one embodiment, the processor is configured to perform a predictive diagnosis in order to forecast future faults and problems in the tyre and/or vehicle. The derived data may include alarm (alert) signals.

The reference data may also include threshold values. If the measurement parameters of the tyre (or of the vehicle or of the tool or the derived data) exceed the threshold values, the processor can send alarms (alert) signals to a user. An alert signal may be sent, for example, to a smartphone of a vehicle owner to warn them that it is necessary to go to a repair shop (for example, to change the tyres). An alert signal may be sent, for example, to an electronic control unit of the vehicle to advise the user (through the equipment on board) that it is necessary to go to a repair shop. In the case of driverless vehicles (where the vehicle is piloted by the electronic control unit) an alarm (alert) signal may be sent, for example, to the vehicle's electronic control unit to instruct it to drive the vehicle to a repair shop. At the same time, an alarm (alert) signal may be sent to a repair shop advising the latter that a certain vehicle is expected to arrive and containing information as to the repair work that needs to be carried out on the vehicle.

The derived data may include a work carried out by frictional forces on the wheels.

The derived data may include an abradability parameter.

The derived data may include a moment of inertia of the wheel. The processor 4 generates the moment of inertia of the wheel from wheel measurement parameters (measured with a balancing machine).

In one embodiment, the processor 4 includes an artificial intelligence system programmed to update the reference data contained in the knowledge dataset 3 as a function of the derived data.

In one embodiment, the system 1 comprises a user interface 5. The user interface 5 is connected to the processor 4. The user interface 5 is configured to provide one or more addressees with one or more of the following: the at least one tyre measurement parameter, the at least one vehicle measurement parameter, the at least one tool measurement parameter, the at least one wheel measurement parameter, the at least one rim measurement parameter.

The one or more addressees may include one or more of the following addressees: repair shops (tyre mechanics); owner of the system according to this disclosure; vehicle owners; vehicle manufacturers; tyre manufacturers; standards authorities; insurance bodies; car rental companies; transport companies; software developers (for example, for electronic control units); financers; service providers, testers.

In one embodiment, the user interface 5 is configured to receive instructions from a user. The instructions may include queries allowing data to be retrieved from the database 3. The instructions may include instructions imparted to the processor 4 as to how to update the knowledge dataset 3.

The following paragraphs, listed in alphanumeric order for reference, are non-limiting example modes of describing this invention.

A00. A system for the management of data pertaining to a vehicle (or a plurality of vehicles), comprising:
- a database including, for each vehicle, at least one measurement parameter of a vehicle (or a part of it), the measurement parameter representing a physical quantity linked to the vehicle or to a part of it (or to a use of the vehicle or the part of it);
- a processor having access to the database and programmed to process the at least one measurement parameter and to generate derived data.

A0. The system according to paragraph A00, wherein the database further includes, for each vehicle, one or more of the following elements:
- a vehicle identification code;
- a time mark relating to a respective measurement parameter, wherein the time mark provides an indication of the time the tyre measurement parameter was captured.

A. The system according to paragraph A00 or paragraph A0, wherein the system is a system adapted to manage data pertaining to a wheel service, wherein:
- for each tyre, the database includes a tyre identification code;
- the at least one measurement parameter includes a measurement parameter representing a physical quantity linked to the tyre or to a use thereof.

A1. The system according to paragraph A (or A00 or A0), wherein the processor is programmed to store the derived data.

A1.1. The system according to paragraph A1, wherein the processor is programmed to store the derived data in the database.

A2. The system according to any one of paragraphs A to A1.1 (or A00 or A0), comprising a knowledge dataset containing reference data.

A2.1. The system according to paragraph A2, wherein the reference data represent a model of vehicle road behaviour.

A2.2. The system according to paragraph A2 or paragraph A2.2, wherein the processor is programmed to process the at least one measurement parameter on the basis of the reference data in order to generate the derived data.

A2.3. The system according to any one of paragraphs A2 to A2.2, wherein the reference data contained in the knowledge dataset include one or more threshold values relating to the at least one tyre measurement parameter and one or more processing criteria relating to the tyre.

A2.3.1. The system according to paragraph A2.3, wherein the processor is configured to use the one or more processing criteria relating to the tyre to compare the at least one tyre measurement parameter with the respective threshold values to generate the derived data.

A2.4. The system according to any one of paragraphs A2 to A2.3.1, wherein the processor is programmed to update the reference data contained in the knowledge dataset as a function of the derived data.

A2.4.1. The system according to paragraph A2.4, wherein the processor is programmed to update the reference data contained in the knowledge dataset as a function of the derived data, based on instructions given by a user.

A2.4.2. The system according to paragraph A2.4 or paragraph A2.4.1, wherein the processor includes an artificial intelligence system configured to update the reference data contained in the knowledge dataset as a function of the derived data.

A3. The system according to any one of paragraphs A to A2.4.1 (or A00 or A0), wherein the at least one tyre measurement parameter includes one or more of the following parameters:

tyre runout;
minimum and/or maximum depth of tyre tread;
tyre tread profile;
tyre pressure;
tyre noise;
tyre radial forces;
tyre lateral forces;
rolling resistance of tyre;
coefficient of elasticity of tyre;
maximum strain applied to bead during demounting;
tyre age;
distance travelled by the tyre;
vertical load of tyre;
maximum temperature of tyre in use.

A3.1. The system according to paragraph A3, wherein the database further includes, for each tyre, at least one characteristic tyre parameter, where the at least one characteristic tyre parameter includes one or more of the following parameters:
tyre make and model;
summer, winter or all seasons tyre type;
tyre manufacturing date.

A4. The system according to any one of paragraphs A to A3 (or A00 or A0), wherein the database also includes, for each vehicle, a vehicle identification code, at least one vehicle measurement parameter, representing a physical quantity linked to the vehicle or to a use thereof, and a respective time mark which provides an indication of the time the vehicle measurement parameter was captured.

A4.1. The system according to paragraph A4, wherein the at least one vehicle measurement parameter includes one or more of the following parameters:
vehicle wheel alignment data;
vehicle braking data;
data relating to vehicle suspensions;
vehicle drift data;
distance travelled by vehicle;
real consumption of vehicle;
vehicle weight;
vehicle emissions data;
vehicle noise data;
data relating to vehicle lights.

A4.1.1 The system according to paragraph A4.1, wherein the database also includes, for each vehicle, at least one characteristic vehicle parameter, where the at least one characteristic vehicle parameter includes one or more of the following parameters:
vehicle make and model;
identification code of an electronic control unit of the vehicle;
date of vehicle manufacture.

A4.2. The system according to any one of paragraphs A4 to A4.4.1, wherein the database includes a correlation which associates each tyre identification code with the identification code of the respective vehicle.

A4.3. The system according to any one of paragraphs A4 to A4.2, wherein the reference data contained in the knowledge dataset include one or more threshold values relating to the at least one vehicle measurement parameter and one or more processing criteria relating to the vehicle.

A4.3.1. The system according to paragraph A4.3, wherein the processor is configured to use the one or more processing criteria relating to the vehicle to compare the at least one vehicle measurement parameter with the respective threshold values to generate (part of) the derived data.

A4.4. The system according to any one of paragraphs A4 to A4.3.1, wherein the database is accessible to one or more repair shops, where each repair shop comprises tools designed to measure the at least one vehicle measurement parameter.

A4.4.1. The system according to paragraph A4.4, wherein the database includes a correlation which associates each vehicle measurement parameter with the identification code of the tool that was used to capture that vehicle measurement parameter.

A4.5. The system according to any one of paragraphs A4 to A4.4.1, wherein the processor is programmed to generate (part of) the derived data as a function of the at least one vehicle measurement parameter and reference data contained in the knowledge base.

A5. The system according to any one of paragraphs A to A4.5 (or A00 or A0), wherein the database is accessible to one or more repair shops, where each repair shop comprises tools designed to measure the at least one tyre measurement parameter (or at least one vehicle measurement parameter).

A5.1. The system according to paragraph A5, wherein the database includes a tool identification code for at least one of the tools.

A5.1.1. The system according to paragraph A5.1, wherein the database includes a correlation which associates each tyre measurement parameter with the identification code of the tool that was used to capture that tyre measurement parameter.

A5.2. The system according to any one of paragraphs A4.4 to A5.1.1, wherein the database also includes, for one or more of the tools, a tool identification code, at least one tool measurement parameter, representing a physical quantity linked to the tool or to a use thereof, and a respective time mark which provides an indication of the time the tool measurement parameter was captured.

A5.2.1. The system according to paragraph A5.2, wherein the at least one tool measurement parameter includes one or more of the following parameters:
tool energy consumption;
tool compressed air consumption;
number of tool use cycles.
maintenance operations on the tool.

A5.3. The system according to any one of paragraphs A5 to A5.2.1, wherein the processor is programmed to generate (part of) the derived data as a function of the at least one tool measurement parameter and reference data contained in the knowledge base.

A5.4. The system according to any one of paragraphs A5 to A5.3, wherein the reference data contained in the knowledge dataset include one or more threshold values relating to the at least one tool measurement parameter and one or more processing criteria relating to the tool.

A5.4.1. The system according to paragraph A5.4, wherein the processor is configured to use the one or more processing criteria relating to the tool to compare the at least one tool measurement parameter with the respective threshold values to generate (part of) the derived data.

A6. The system according to any one of paragraphs A to A5.3 (or A00 or A0), wherein the derived data include one or more of the following parameters:
tyre wear index at the time the at least one tyre measurement parameter was captured;
irregular tyre wear index at the time the at least one tyre measurement parameter was captured;
trend of tyre wear index during use of the tyre;
trend of irregular tyre wear index during use of the tyre;
trend of tyre pressure during use of the tyre;
scheduled tyre change date.

A7. The system according to any one of paragraphs A to A6 (or A00 or A0), including a user interface connected to the processor and configured to provide one or more addressees with the tyre measurement parameter and/or the derived data.

A8. The system according to any one of paragraphs A to A7 (or A00 or A0), wherein the vehicle identification code is uniquely correlated with the electronic control unit of the vehicle.

A8.1. The system according to paragraph A8, wherein the processor is connectable to the control unit of the vehicle to receive from the electronic control unit at least one vehicle measurement parameter.

A8.2. The system according to paragraph A8 or paragraph A8.1, wherein the processor is connectable to the control unit of the vehicle to receive from the electronic control unit at least one tyre measurement parameter.

A8.3. The system according to any one of paragraphs A8 to A8.2, wherein the processor is configured to send at least one signal to the electronic control unit as a function of at least one of the derived data items.

B00. A method for the management of data pertaining to a vehicle (or a plurality of vehicles), comprising the following steps:
  collecting in a database, for each vehicle, at least one measurement parameter of a vehicle or a part thereof the measurement parameter representing a physical quantity linked to the vehicle or to a part of it (or to a use of the vehicle or the part of it);
  processing the at least one measurement parameter contained in the database and generating derived data by means of a processor.

B0. The method according to paragraph B00, comprising a step of collecting in the database, for each vehicle, one or more of the following elements:
  a vehicle identification code;
  a time mark relating to a respective measurement parameter, wherein the time mark provides an indication of the time the tyre measurement parameter was captured.

B. The method according to paragraph B00 or paragraph B0, wherein the method is a method for managing data pertaining to a wheel service, comprising a step of collecting in the database, for each tyre, a tyre identification code, and wherein the at least one measurement parameter includes a measurement parameter representing a physical quantity linked to the tyre or to a use thereof.

B1. The method according to paragraph B (or B00 or B0), comprising a step of storing the derived data.

B1.1. The method according to paragraph B1, wherein the derived data are stored in the database during the step of storing.

B2. The method according to any one of paragraphs B to B1.1 (or B00 or B0) wherein the derived data are obtained, during the step of processing, as a function of the at least one tyre measurement parameter and reference data.

B2.1. The method according to paragraph B2, wherein the reference data are contained in a knowledge dataset connected to the processor.

B2.2. The method according to paragraph B2 or paragraph B2.1, wherein the reference data represent a model of vehicle road behaviour.

B2.3. The method according to any one of paragraphs B2 to B2.2, wherein the reference data contained in the knowledge dataset include one or more threshold values relating to the at least one tyre measurement parameter and one or more processing criteria relating to the tyre.

B2.3.1. The method according to paragraph B2.3, wherein the step of processing includes comparing the at least one tyre measurement parameter with the respective threshold values, based on the one or more processing criteria relating to the tyre, in order to generate (part of) the derived data.

B2.4. The method according to any one of paragraphs B2 to B2.3.1, comprising a step of updating the reference data contained in the knowledge dataset as a function of the derived data.

B2.4.1. The method according to paragraph B2.4, wherein the step of updating is performed by the processor, based on instructions imparted by a user.

B2.4.1. The method according to paragraph B2.4 or paragraph B2.4.1, wherein the step of updating is performed by the processor using an artificial intelligence system.

B3. The method according to any one of paragraphs B to B2.3.1 (or B00 or B0), wherein the at least one tyre measurement parameter includes one or more of the following parameters:
  tyre runout;
  minimum and/or maximum depth of tyre tread;
  tyre tread profile;
  tyre pressure;
  tyre noise;
  tyre radial forces;
  tyre lateral forces;
  rolling resistance of tyre;
  coefficient of elasticity of tyre;
  maximum strain applied to bead during demounting;
  tyre age;
  distance travelled by the tyre;
  vertical load of tyre;
  maximum temperature of tyre in use.

B.3.1. The method according to paragraph B3, wherein the database further includes, for each tyre, at least one characteristic tyre parameter, where the at least one characteristic tyre parameter includes one or more of the following parameters:
  tyre make and model;
  summer, winter or all seasons tyre type;
  tyre manufacturing date.

B4. The method according to any one of paragraphs B to B3.1 (or B00 or B0), wherein the database also includes, for each vehicle, a vehicle identification code, at least one vehicle measurement parameter, representing a physical quantity linked to the vehicle or to a use thereof, and a respective time mark which provides an indication of the time the vehicle measurement parameter was captured.

B4.1. The method according to paragraph B4, wherein the at least one vehicle measurement parameter includes one or more of the following parameters:
  vehicle wheel alignment data;
  vehicle braking data;
  data relating to vehicle suspensions;
  vehicle drift data;
  distance travelled by vehicle;
  real consumption of vehicle;
  vehicle weight;
  vehicle emissions data;
  vehicle noise data;
  data relating to vehicle lights.

B4.1.1. The method according to paragraph B4.1, wherein the database also includes, for each vehicle, at least one characteristic vehicle parameter, where the at least one characteristic vehicle parameter includes one or more of the following parameters:
  vehicle make and model;

identification code of an electronic control unit of the vehicle;

date of vehicle manufacture.

B4.2. The method according to any one of paragraphs B4 to B4.4.1, comprising a step of associating a tyre with the respective vehicle by means of a correlation which is contained in the database and which associates each tyre identification code with the identification code of the respective vehicle.

B4.3. The method according to any one of paragraphs B4 to B4.2, wherein the reference data contained in the knowledge dataset include one or more threshold values relating to the at least one vehicle measurement parameter and one or more processing criteria relating to the vehicle.

B4.3.1. The method according to paragraph B4.3, wherein the step of processing includes comparing the at least one vehicle measurement parameter with the respective threshold values, based on the one or more processing criteria relating to the tyre, in order to generate (part of) the derived data.

B4.4. The method according to any one of paragraphs B4 to B4.3.1, wherein the database is accessible to one or more repair shops and each repair shop comprises one or more tools, wherein the method comprises a step of measuring the at least one vehicle measurement parameter using the tools.

B4.4.1. The method according to paragraph B4.4, comprising a step of associating a vehicle measurement parameter with the tool used to capture that vehicle measurement parameter, performed by means of a correlation, contained in the database, which associates each vehicle measurement parameter with the identification code of the tool that was used to capture that vehicle measurement parameter.

B4.5. The method according to any one of paragraphs B4 to B4.4.1, wherein the step of processing includes deriving the derived data also as a function of the at least one vehicle measurement parameter and reference data contained in the knowledge base.

B5. The method according to any one of paragraphs B to B4.5 (or B00 or B0), wherein the database is accessible to one or more repair shops, where each repair shop comprises one or more tools, wherein the method comprises a step of measuring the at least one tyre measurement parameter using the tools.

B5.1. The method according to paragraph B5, wherein the database includes a tool identification code for at least one of the tools.

B5.1.1 The method according to paragraph B.15, comprising a step of associating a tyre measurement parameter with the tool used to capture that tyre measurement parameter, performed by means of a correlation, contained in the database, which associates each tyre measurement parameter with the identification code of the tool that was used to capture that tyre measurement parameter.

B5.2. The method according to any one of paragraphs B4.4 to B5.1, wherein the database also includes, for one or more of the tools, a tool identification code, at least one tool measurement parameter, representing a physical quantity linked to the tool or to a use thereof, and a respective time mark which provides an indication of the time the tool measurement parameter was captured.

B5.2.1. The method according to paragraph B5.2, wherein the at least one tool measurement parameter includes one or more of the following parameters:

tool energy consumption;

tool compressed air consumption;

number of tool use cycles.

maintenance operations on the tool.

B5.3. The method according to any one of paragraphs B5 to B5.2.1, wherein the step of processing comprises deriving the derived data also as a function of the at least one tool measurement parameter and reference data contained in the knowledge base.

B5.4. The method according to any one of paragraphs B5 to B5.3, wherein the reference data contained in the knowledge dataset include one or more threshold values relating to the at least one tool measurement parameter and one or more processing criteria relating to the tool.

B5.4.1. The method according to paragraph B5.4, wherein the step of processing comprises comparing the at least one tool measurement parameter with the respective threshold values, based on the one or more processing criteria relating to the tool, in order to generate (part of) the derived data.

B6. The method according to any one of paragraphs B to B.5.3 (or B00 or B0), wherein the derived data include one or more of the following parameters:

tyre wear index at the time the at least one tyre measurement parameter was captured;

irregular tyre wear index at the time the at least one tyre measurement parameter was captured;

trend of tyre wear index during use of the tyre;

trend of irregular tyre wear index during use of the tyre;

trend of tyre pressure during use of the tyre;

scheduled tyre change date.

B7. The method according to any one of paragraphs B to B6 (or B00 or B0), comprising a step of communicating the tyre measurement parameter and/or the derived data to one or more addressees by means of a user interface.

B8. The method according to any one of paragraphs B to B7 (or B00 or B0), comprising a step of associating the vehicle identification code with an electronic control unit of the vehicle.

B8.1. The method according to paragraph B8, comprising a step of receiving at least one vehicle measurement parameter from the electronic control unit.

B8.2. The method according to paragraph B8 or paragraph B8.1, comprising a step of receiving at least one tyre measurement parameter from the electronic control unit.

B8.3. The method according to any one of paragraphs B8 to B8.2, comprising a step of sending at least one signal to the electronic control unit as a function of at least one of the derived data items.

The invention claimed is:

1. A system for the management of data pertaining to a wheel service, comprising:

a database including, for each tyre of a plurality of tyres of at least one vehicle, a tyre identification code; at least one tyre measurement parameter representing a physical quantity linked to the tyre or to the use thereof, and a related time mark, which indicates the time the tyre measurement parameter was captured;

a knowledge dataset containing reference data;

a processor having access to the database and to the knowledge dataset and programmed for processing the at least one tyre measurement parameter based on the reference data and for generating derived data, wherein the database is accessible by one or more repair shops, each repair shop of said plurality of repair shops comprising tools responsible for capturing the at least one tyre measurement parameter, wherein the database also includes, for at least one of the tools, a tool identification code, and wherein the database includes a correlation, which associates each tyre identification code with an identification code of the respective vehicle and which associates each tyre measurement parameter with the identification code of the tool that was used to capture that tyre measurement parameter.

2. The system according to claim 1, wherein the reference data represent a model of vehicle road behaviour.

3. The system according to claim 2, wherein the processor is programmed to update the reference data contained in the knowledge dataset as a function of the derived data.

4. The system according to claim 1, wherein the database also includes, for each vehicle, a vehicle identification code, at least one vehicle measurement parameter, representing a physical quantity linked to the vehicle or to a use thereof, and a respective time mark which provides an indication of the time the vehicle measurement parameter was captured.

5. The system according to claim 1, wherein the database includes, for each vehicle, at least one vehicle measurement parameter, representing a physical quantity linked to the vehicle or to a use thereof, and wherein the at least one vehicle measurement parameter includes one or more of the following parameters:
    vehicle wheel alignment data;
    vehicle braking data;
    data relating to vehicle suspensions;
    vehicle drift data;
    real consumption of vehicle;
    distance travelled by vehicle;
    vehicle weight;
    vehicle emissions data;
    vehicle noise data;
    data relating to vehicle lights.

6. The system according to claim 5, wherein the database also includes, for each vehicle, at least one characteristic vehicle parameter, where the at least one characteristic vehicle parameter includes one or more of the following parameters:
    vehicle make and model;
    identification code of an electronic control unit of the vehicle;
    date of vehicle manufacture.

7. The system according to claim 1, wherein the database is accessible by one or more repair shops, wherein each repair shop comprises tools responsible for capturing the at least one tyre measurement parameter and wherein the database also includes, for one or more of the tools, at least one tool measurement parameter representing a physical quantity linked to the tool or to a use thereof, and a respective time mark which provides an indication of the time the tool measurement parameter was captured.

8. A system for the management of data pertaining to a wheel service, comprising:
    a database including, for each tyre of a plurality of tyres of at least one vehicle, a tyre identification code; at least one tyre measurement parameter representing a physical quantity linked to the tyre or to the use thereof, and a related time mark, which indicates the time the tyre measurement parameter was captured;
    a knowledge dataset containing reference data;
    a processor having access to the database and to the knowledge dataset and programmed for processing the at least one tyre measurement parameter based on the reference data and for generating derived data,
wherein the database is accessible by one or more repair shops, wherein each repair shop comprises tools responsible for capturing the at least one tyre measurement parameter and wherein the database also includes, for one or more of the tools, at least one tool measurement parameter representing a physical quantity linked to the tool or to a use thereof, and a respective time mark which provides an indication of the time the tool measurement parameter was captured, and
wherein the at least one tool measurement parameter includes one or more of the following parameters:
    tool energy consumption;
    tool compressed air consumption;
    number of tool use cycles;
    maintenance operations on the tool.

9. The system according to claim 1, wherein the at least one tyre measurement parameter includes one or more of the following parameters:
    tyre runout;
    minimum and/or maximum depth of tyre tread;
    tyre tread profile;
    tyre pressure;
    tyre noise;
    tyre radial forces;
    tyre lateral forces;
    distance travelled by the tyre.

10. The system according to claim 9, wherein the database further includes, for each tyre of said plurality of tyres, at least one characteristic tyre parameter, wherein the at least one characteristic tyre parameter includes one or more of the following parameters:
    tyre make and model;
    summer, winter or all seasons tyre type;
    tyre manufacturing date.

11. The system according to claim 1, wherein the reference data contained in the knowledge dataset include:
    one or more threshold values relating to the at least one tyre measurement parameter;
    one or more processing criteria;
    wherein the processor is configured to use the one or more processing criteria to compare the at least one tyre measurement parameter with the respective threshold values to generate the derived data.

12. The system according to claim 1, wherein the derived data include one or more of the following parameters:
    tyre wear index at the time the at least one tyre measurement parameter was captured;
    irregular tyre wear index at the time the at least one tyre measurement parameter was captured;
    trend of tyre wear index during use of the tyre;
    trend of irregular tyre wear index during use of the tyre;
    trend of tyre pressure during use of the tyre;
    scheduled tyre change date.

13. The system according to claim 1, including a user interface connected to the processor and configured to provide one or more addressees with the at least one tyre measurement parameter and with the derived data.

14. A method for the management of data pertaining to a wheel service, comprising the following steps:
    for each tyre of a plurality of tyres of at least one vehicle, collecting in a database a tyre identification code, at least one tyre measurement parameter representing a physical quantity linked to the tyre or to the use thereof, and a related time mark, which indicates the time the tyre measurement parameter was captured;
    processing, with a processor, the at least tyre measurement parameter contained in the database based on reference data contained in a knowledge dataset, and generating derived data,
wherein the database is accessible by one or more repair shops, each repair shop of said plurality of repair shops comprising tools responsible for capturing the at least one tyre measurement parameter, wherein the method further comprises collecting in the database, for at least one of the tools, a tool identification code, wherein the database includes a correlation, which associates each tyre identification code with an identification code of the respective vehicle and which associates each tyre measurement parameter with the identification code of the tool that was used to capture that tyre measurement parameter.

15. The method according to claim 14, wherein the reference data represent a model of vehicle road behaviour.

16. The method according to claim 14, comprising a step of updating the reference data, contained in the knowledge dataset, as a function of the derived data.

17. The method according to claim 14, comprising a step of associating a vehicle measurement parameter with a tool used to capture that vehicle measurement parameter.

18. The method according to claim 14, further comprising collecting in the database, for one or more of the tools, at least one tool measurement parameter representing a physical quantity linked to the tool or to a use thereof, and a respective time mark which provides an indication of the time the tool measurement parameter was captured, wherein the at least one tool measurement parameter includes one or more of the following parameters:
tool energy consumption;
tool compressed air consumption;
number of tool use cycles;
maintenance operations on the tool.

19. The system according to claim 7, wherein the database also includes, for one or more of the tools, at least one tool measurement parameter representing a physical quantity linked to the tool or to a use thereof, and a respective time mark which provides an indication of the time the tool measurement parameter was captured, and wherein the at least one tool measurement parameter includes one or more of the following parameters:
tool energy consumption;
tool compressed air consumption;
number of tool use cycles;
maintenance operations on the tool.

20. The system according to claim 8, wherein the database also includes, for at least one of the tools, a tool identification code, and wherein the database includes a correlation which associates each tyre identification code with an identification code of the respective vehicle and which associates each tyre measurement parameter with the identification code of the tool that was used to capture that tyre measurement parameter.

* * * * *